(12) United States Patent
Spillman et al.

(10) Patent No.: US 9,210,746 B2
(45) Date of Patent: Dec. 8, 2015

(54) LIGHT DIMMING CONTROL

(75) Inventors: Vance P. Spillman, Bristol, RI (US);
Craig H. Rosenquist, Scituate, MA (US); Jeremy B. Barber, South Easton, MA (US)

(73) Assignee: Sunrise Technologies, Inc., Rayham, MA (US)

( * ) Notice: Subject to any disclaimer, the term of this patent is extended or adjusted under 35 U.S.C. 154(b) by 1034 days.

(21) Appl. No.: 13/229,140

(22) Filed: Sep. 9, 2011

(65) Prior Publication Data

US 2012/0062128 A1    Mar. 15, 2012

Related U.S. Application Data

(60) Provisional application No. 61/381,686, filed on Sep. 10, 2010.

(51) Int. Cl.
*H05B 37/02* (2006.01)
*H05B 33/08* (2006.01)

(52) U.S. Cl.
CPC ........... *H05B 33/0815* (2013.01); *Y02B 20/346* (2013.01)

(58) Field of Classification Search
CPC ............... H05B 33/08; H05B 33/0803; H05B 33/0815; H05B 37/00; H05B 37/02; Y02B 20/341; Y02B 20/346
USPC .............. 315/209 R, 224–225, 291, 307, 308
See application file for complete search history.

(56) References Cited

U.S. PATENT DOCUMENTS 5,323,088 A * 6/1994 Cunningham ........ H02M 5/257
                                                        315/195
2011/0095703 A1* 4/2011 Wilson et al. .................. 315/294

* cited by examiner

*Primary Examiner* — Jimmy Vu
(74) *Attorney, Agent, or Firm* — Strategic Patents, P.C.

(57) ABSTRACT

A power supply to an LED-based street or area light is operated to provide a dimming control signal, which is in turn processed by a circuit to produce 0-10 V DC, pulse width modulated (PWM) signals, or any other suitable signal that can variably control LEDs within the light. The on/off power interruptions could be provided, for example, from a photoelectric control, a timer circuit, or a pre-programmed or manually controlled timer/contactor. The signal to the on/off device could also or instead be initiated by an RF or power line carrier signal to cause the power interruptions.

7 Claims, 5 Drawing Sheets

LIGHT DIMMING CONTROL

RELATED APPLICATIONS

This application is claims the benefit of U.S. App. No. 61/381,686, filed on Sep. 10, 2010, which application is incorporated herein by reference in its entirety.

BACKGROUND

Street and area lights are installed to provide illumination for safety, recreation, and other purposes. The lights are typically controlled for dusk-to-dawn operation by individual photoelectric controls, timers/contactors (controlling strings of lights), or a power line carrier. The installed base of street lights mostly use gas lighting elements such as mercury vapor lamps, high-pressure sodium vapor lamps, and metal halide lamps. These lamps can only accommodate minimal dimming, with only minimal corresponding savings in energy/cost. As such, the housings, wiring, and other electronics of this installed based typically provides only for on and off operation. More specifically, the present photoelectric controls for street lights typically provide on and off operation through two-wire or three-wire connections, which may be coupled to the light through a NEMA locking three prong receptacle and twist lock or the like. Direct wired photoelectric devices are also sometimes used, as are built-in or attached timers. However, these existing devices uniformly provide simple on/off control to the street light.

By contrast, the intensity of arrays of high-powered LEDs can be easily controlled simply by varying DC current or voltage, or using pulse width modulation (PWM) or other techniques. As the brightness and efficiency of LEDs has improved, LED technology is becoming a suitable candidate for street and area lighting. In this context, full light is not required at all times and dimming the lights could save considerable electricity, even though existing light fixtures do not accommodate this type of variable control.

There remains a need for variable control of LED lights adapted to existing street light infrastructure.

SUMMARY

A power supply to an LED-based street or area light is operated to provide a dimming control signal, which is in turn processed by a circuit to produce 0-10 V DC, pulse width modulated (PWM) signals, or any other suitable signal that can variably control LEDs within the light. The on/off power interruptions could be provided, for example, from a photoelectric control, a timer circuit, or a pre-programmed or manually controlled timer/contactor. The signal to the on/off device could also or instead be initiated by an RF or power line carrier signal to cause the power interruptions.

In one aspect, a dimmer for use in a street light or the like may actuate dimming using existing two-wire or three-wire systems. The power-on/power-off switching (such as a relay or timer/contactor) of an actuator may provide a signal to a circuit for dimming control, which in turn may sense the on/off power interruptions and create a control signal to a variable-intensity lighting system such as driver and an array of LEDs. The control signal may be a 0-10 Volt DC, a pulse with modulation (PWM) signal, or any other signal suitable for encoding variable-intensity lighting control. The control signal may also directly drive the array of LEDs.

BRIEF DESCRIPTION OF THE DRAWINGS

The foregoing and other objects, features and advantages of the invention will be apparent from the following description of particular embodiments thereof, as illustrated in the accompanying drawings. The drawings are not necessarily to scale, emphasis instead being placed upon illustrating the principles of the invention.

DETAILED DESCRIPTION

Described herein are devices and methods for variably controlling the intensity of LED lights through lighting fixtures constructed for use with gas lamps. It will be understood that while the exemplary embodiments described below emphasis conventional street lights, the techniques described herein may be suitably adapted to any variable-output device that might be usefully controlled through power cycling of a fixed-output fixture. All such variations are intended to fall within the scope of this disclosure.

Figure 1:
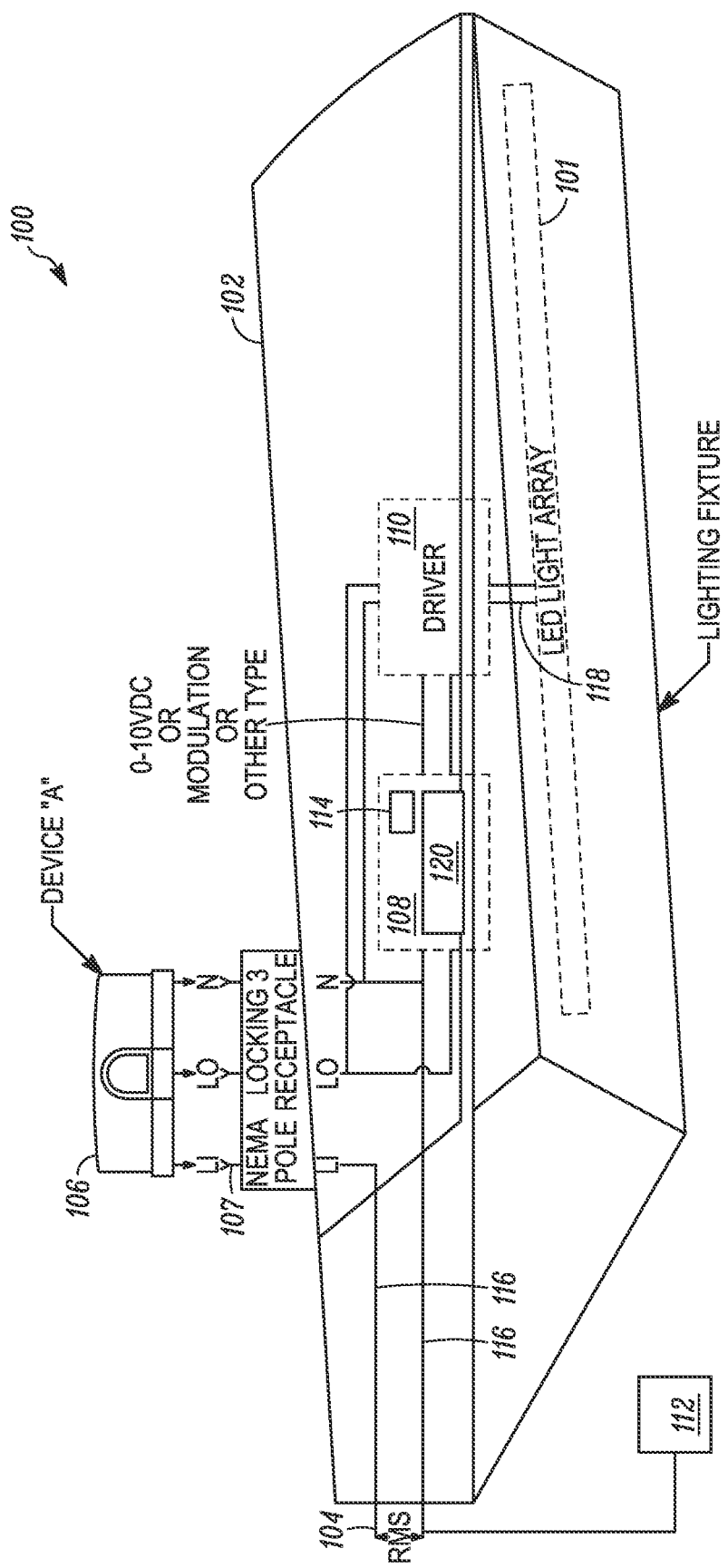
FIG. 1 shows a street light fixture adapted for variable control of an LED array.

FIG. 1 shows a light fixture adapted for variable control of an LED array. The light fixture 100 may include an LED array 101, a power line 104 in, one or more terminals 107 for switching control of the constant power, a receptacle for a lamp or light array, and a housing 102, along with any mounting hardware, lenses or light covers, and so forth. The light fixture 100 may generally be any fixture, such as a street light fixture, an area light fixture, or more generally any outdoor light fixture. In general, the light fixture 100 may be, or may include parts of, a gas lamp fixture originally constructed for use with a conventional gas lamp such as a mercury vapor lamp, a high-pressure sodium vapor lamp, or a metal halide lamp. Thus in one aspect there is disclosed herein an LED-based retrofit to an existing gas lamp fixture.

The light fixture 100 may be an outdoor light fixture including a housing 102 suitable for use, e.g., as a street light or other outdoor illumination source. The housing 102 may be weatherproof or otherwise adapted to outdoor use.

The LED array 101 may be mounted in the light fixture 100 and may contain one or more light emitting diodes (LEDs) such as high-intensity, white light LEDs or any other suitable LEDs or combination of LEDs for an intended lighting application.

A power line 104 may be coupled to the light fixture 100, as indicated by two leads entering the fixture on the left. In general, the power line 104 may provide a constant DC or AC power to the fixture, such as in conventional street or area lighting applications. The power line 104 may also or instead supply power with brief dropouts controlled by a power supply 112 such a master controller that provides power to a plurality of street lights or other lighting fixtures. In one aspect, the power supply 112 may provide a number of different predetermined signals over the course of a night. For example, the power supply 112 may turn of power for a brief interval at two hours before midnight, for two brief intervals spaced apart by one second at midnight, and for three brief intervals spaced apart by one second at two hours after midnight. In this manner, the power supply 112 may provide a form of timing signals that can be interpreted by light fixtures to variably control illumination over the course of a night. The power supply 112 may also or instead include a street light power supply with a constant voltage, or a street light power supply that includes a timed contactor, a light-activated actuator that selectively delivers power according to ambient light, or any other components suitable for continuous or variable delivery of power to the outdoor light fixture 100.

The power line 104 may include a first pair of leads 116 from the housing 102, which may include any wires and/or other electronic connectors or combination of components suitable for coupling the outdoor lighting fixture 100 to a remote power source such as the power supply 112. A second pair of leads 118 may extend from the housing 102 to the LED array 101 or any suitable coupling for same.

An actuator 106 may be provided that independently switches power from the power line, thereby providing a switched output. The actuator 106 may be removably and replaceably attached to the outdoor light fixture 102 with a coupling 107 such as a NEMA locking three prong receptacle, which is a commonly used coupling in conventional street lights, or any other suitable electro-mechanical fixture. In another aspect, the actuator may be permanently integrated into the housing of the fixture. The actuator may include a photocontrol or the like to provide power that switches according to, e.g., external illumination, such as by switching on at dusk and off at dawn, or more generally switching on in dim or dark ambient conditions. The actuator may also or instead include a timer, timed contactor, or the like to provide timed control of the switched output. More generally, the actuator may include any combination of photoelectric controls, contactors, timers, radio controls, power line carrier controls, and any other controllers that might be usefully employed to turn outdoor lighting on and off. The actuator may also provide supplemental power supplies including circuitry for power conversion along with one or more additional power outputs. This may be used to operate street light accessories such as holiday lighting, weather instrumentation, or wireless networking equipment.

The actuator 106 may include additional components that provide other features or functionality, such as circuitry for remote control of the switched output via RF signal or the like. For example, the actuator 106 may include a wireless network interface such as a WiFi or ZigBee radio and related hardware/software. Through the wireless network interface, the actuator 106 may include control signals from a remote source such as a base station so that on/off operation of the actuator 106 can be explicitly controlled. This functionality may replace or augment on/off operation from a master controller that provides power through a wired infrastructure. In one aspect, the actuator 106 may include circuitry that converts explicit control signals received over the wireless network into power-cycled dimming signals that can be interpreted by the first circuit 108 as LED intensity information as described below.

A first circuit 108 may be coupled between the switched output and the LED array. The first circuit 108 may include circuitry to convert electricity from the first pair of leads 116 to a predetermined direct current voltage that can be used to power other digital circuitry and to drive LED's in the LED array 101. The first circuit 108 may also or instead include circuitry configured using any suitable digital and/or analog design to be responsive to one or more predetermined power cycles of the switched output to vary an intensity of illumination from the LED array. Thus, for example, if the actuator 106 produces a switched output that is off for, e.g., one second, the first circuit 108 may interpret this as an instruction or control signal to dim the LED array to eighty percent of full intensity. The first circuit 108 may responsively output a control signal that suitably encodes the eighty percent intensity request for use by the LED array 101, or as illustrated in FIG. 1, by a second circuit 110 that operates as a driver for the LED array 101. A switched output that is off for one second, on for one second, off for one second, and then on may also or instead be used to encode sixty percent intensity or some other dimming target. More generally, any number and duration of on/off cycles may be suitably employed as inputs to the first circuit to provide any degree of control over the intensity of illumination consistent with the desired operation of the lighting fixture. The output from the first circuit may encode a control signal using, e.g., 0 to 10 VDC, a PWM signal, or any other suitable technique for encoding output values.

By way of example operation, the actuator 106 may, through a photodetector or the like, turn on during low illumination periods, thus delivering a switched power signal from the power line 104 to the first circuit 108 from dusk to dawn. The first circuit 108 may count or otherwise track a duration interval for the switched power signal and store the duration interval in a non-volatile memory. During subsequent uses, the duration interval may be used to vary illumination control signals to the second circuit 110 over the expected nighttime interval. The first circuit 108 may then provide preprogrammed outputs to the second circuit 110 that vary based upon time within the duration interval (that is, time within the night). For example, the preprogrammed output may specify 25% dimming (in any suitable form or units) at two hours before midnight, 50% dimming at midnight, and 75% dimming at two hours after midnight.

In another aspect, the first circuit 108 may detect signals from a power supply 112 such as the master controller described above, and apply these detected signals to variably control output to the second circuit 110 in response to the master controller signals. A capacitive element 114 such as a battery or capacitor of suitable capacity may be included to provide continuous direct current power to the first circuit 108 and/or second circuit 110 during resulting periods of voltage drop out on the power line 104, or more generally during interruptions of power on the first pair of leads 116, which may include switching by the actuator 106 and/or switching from the power supply 112. This may for example permit continued operation of a counter or similar circuit that monitors and stores information on nighttime intervals.

The first circuit 108 may include a non-volatile memory 120 for storing information related to timed operation of the light fixture 100. For example, as described above, the first circuit 108 may include a timer that counts an interval of darkness (e.g. night time). This interval or count may be stored in the non-volatile memory 120 and used in subsequent day/night cycles to estimate midnight or any other time during which intensity of the LED array 101 might be adjusted, e.g., by dimming. By using a non-volatile memory 120, the interval or count remains stored even during powered down periods such as day time when no alternating current power is supplied to the light fixture 100.

The second circuit 110 (also referred to as a "driver") may receive the control signal from the first circuit 108 that encodes a desired intensity for the LED array 101, and responsively generate an output adapted to provide the desired intensity of illumination from the LED array 101. This may, for example, include intensity data encoded as a pulse width modulation signal with a duty cycle selected for the desired intensity, or a constant current or voltage (e.g., 0-10 VDC) output or other output selected for the desired intensity. The LED array 101 and second circuit 110 may employ a photodetection or thermal feedback loop to achieve more accurate control over output. Thus it will be appreciated that the second circuit 110 may in general be configured to provide controllable dimming (or alternatively stated, intensity of illumination) over any scale and in any suitable increments. This may include a zero to one-hundred scale in integer increments, or where digital control circuitry is used, a 0 to 512 or 0 to 1024 scale. More generally, any suitable scaling and precision may be employed according to the intended use.

In one aspect, the second circuit 110 is coupled to the first circuit 108 and receives direct current voltage therefrom. The second circuit 110 may also be coupled to one or more of the first pair of leads 116, which the second circuit 110 may use as a control input so that the second circuit 110 can control an LED power signal (where the second circuit 110 is coupled directly to the LED array 101) or an LED control signal (where the second circuit 110 is coupled to a driver for the LED array 101) so that the second circuit 110 can vary an intensity of illumination from the LED array 101 in response to the control input.

The second circuit 110 may be configured to estimate a predetermined intermediate point of an on duration of a power signal on the first pair of leads 116, and to store the predetermined intermediate point in the non-volatile memory 120 (which, although depicted as a component of the first circuit 108, may also or instead by a component of the second circuit 110 and/or shared among the two circuits). The predetermined intermediate point may, for example, be a halfway point such as midnight, or any other point. Furthermore, it will be understood that any number of intermediate points may be estimated, such as two hours before midnight, midnight, and two hours after midnight, all based upon the interval of darkness for the light fixture 100. Thus for example, the predetermined intermediate point may be a predetermined interval (e.g., two hours) after a halfway point (e.g., midnight) of the on duration for the light fixture 100. The predetermined intermediate point may also or instead be a predetermined interval prior to the halfway point, such as two hours before midnight.

In one embodiment, the second circuit 110 may use the estimated intermediate point(s) to control intensity of the LED array 101 responsively. For example, the second circuit 110 may be configured to provide a first signal to an LED array on the pair of output leads when the power signal turns on, and a second signal to the LED array at the predetermined intermediate point of the on duration, wherein the second signal specifies lower intensity of light from the LED array than the first signal (such as by switching from 75% intensity to 50% intensity).

Figure 2:
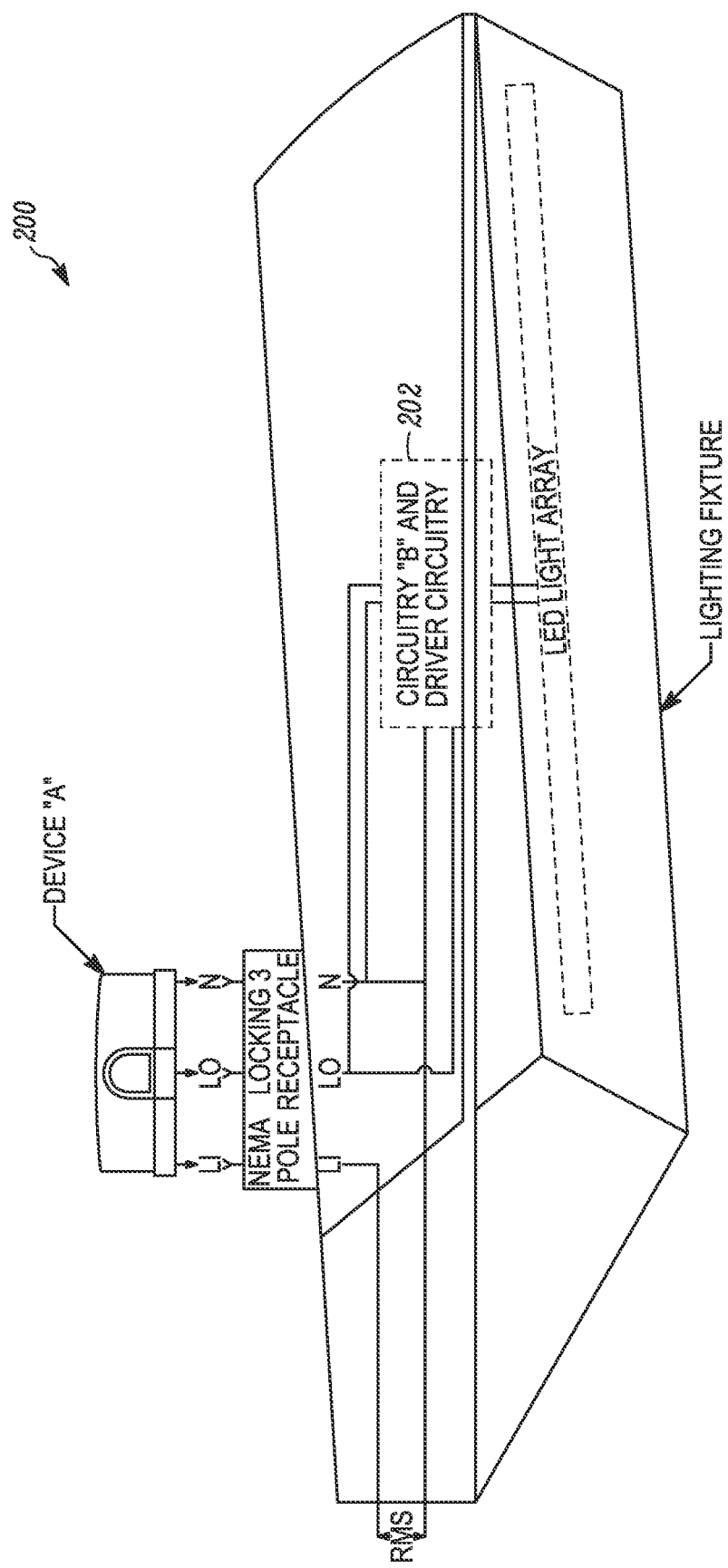
FIG. 2 shows a street light fixture adapted for variable control of an LED array.

FIG. 2 shows a street light fixture adapted for variable control of an LED array. In general, the street light fixture 200 may be as described above in reference to FIG. 1, except that the first circuit and the second circuit (or driver) are combined into a circuit 202 containing circuitry to (a) interpret power cycles and (b) create responsive drive signals to the LED array all as generally described herein. In one aspect, the street light fixture 200 of FIG. 2 may be used in new installations, while the outdoor light fixture 100 of FIG. 1 may be used as a retrofit to an installed fixture that already includes, e.g., an actuator and photodetector for automated night activation or other management of a power cycle.

Figure 3:
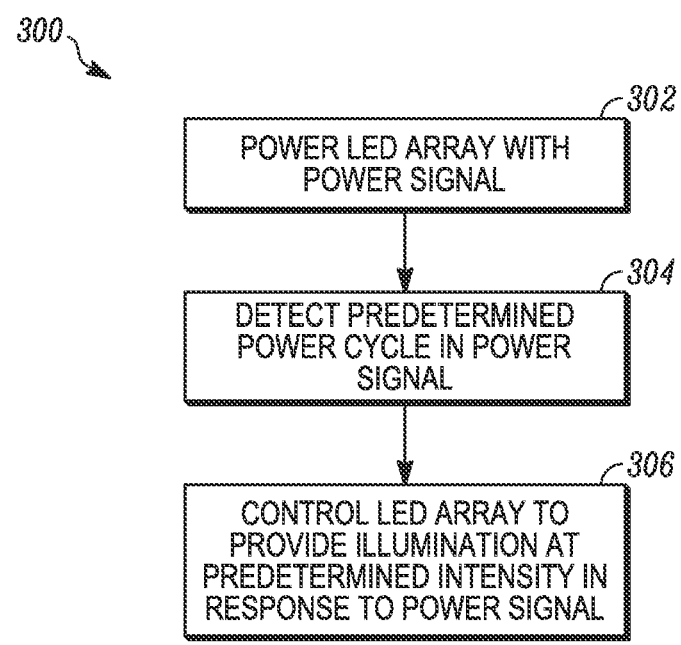
FIG. 3 shows a process for controlling an LED array in a street light fixture.

FIG. 3 shows a process 300 for controlling an LED array in a street light fixture. The method may include powering an LED array of a street light fixture based upon a power signal received from a power line, detecting a predetermined power cycle in the power signal, the predetermined power cycle corresponding to a predetermined intensity for the LED array, and in response to the predetermined power cycle, controlling the LED array to provide illumination at the predetermined intensity.

As shown in step 302, the method 300 may include powering an LED array of an outdoor light fixture based upon a power signal received from a power line. This may for example include converting an alternating current power supply into a direct current power supply suitable for modulation into an LED drive signal.

As shown in step 304, the method 300 may include detecting a predetermined power cycle in the power signal, the predetermined power cycle corresponding to a predetermined intensity for the LED array. This may, for example include detection and use of dropouts in an alternating current signal caused by a master controller or by a separate circuit (such as the first circuit 108 described above) that tracks day and night and applies variable control of power during night periods when illumination is provided by the light fixture. The interval or count data may be updated each night so that it maintains current day and night conditions, which may vary over time.

As shown in step 306, the method 300 may include, in response to the predetermined power cycle, controlling the LED array to provide illumination at the predetermined intensity, all as generally described above.

Figure 4:
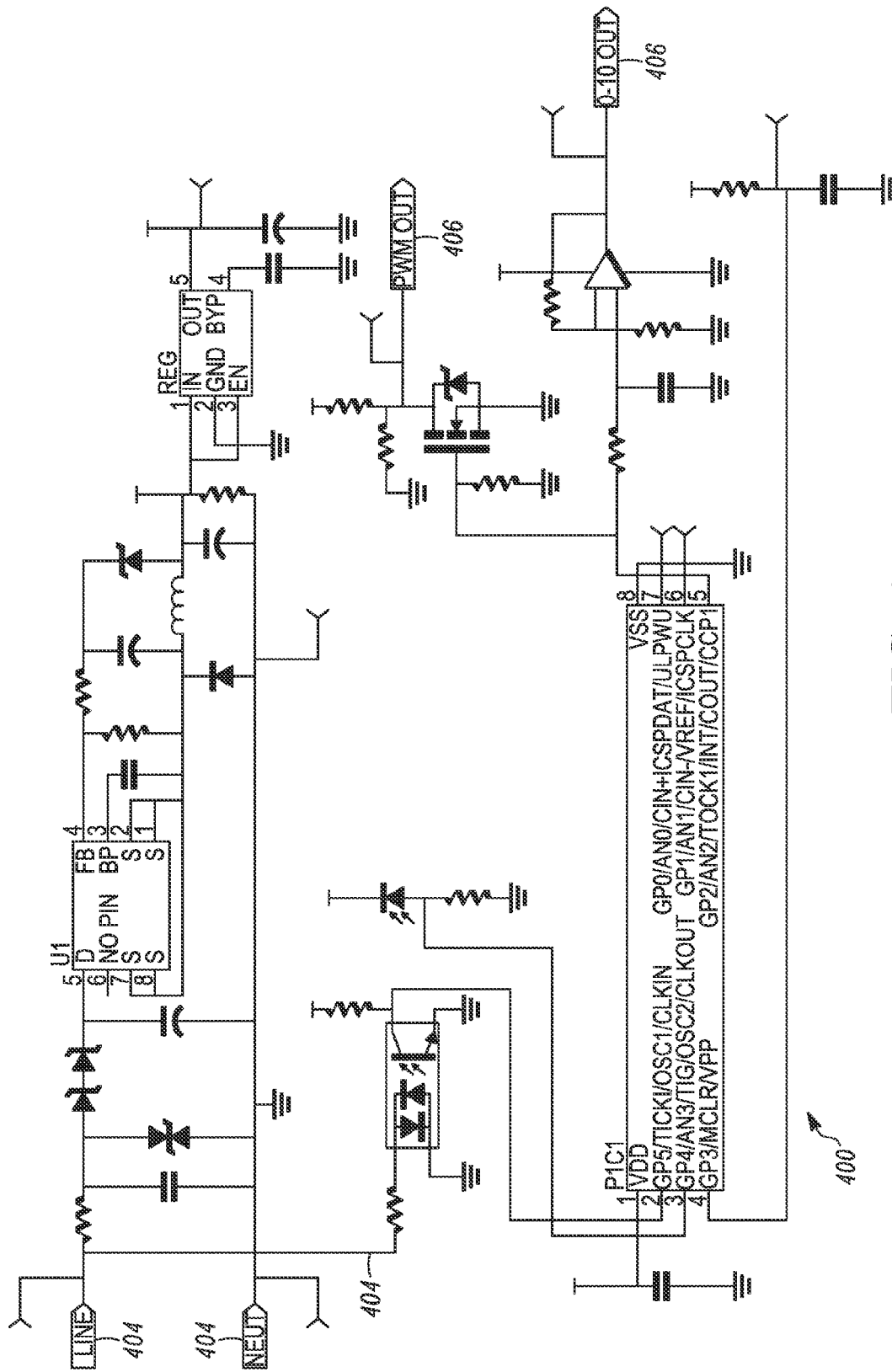
FIG. 4 is a schematic drawing of a control circuit for variable intensity control of an outdoor LED lighting fixture.

FIG. 4 is a schematic drawing of a control circuit 400 for variable intensity control of an outdoor LED lighting fixture such as any of the fixtures described above. In general inputs 404 from a street light power supply or the like are converted into a constant voltage source in a power conversion stage represented on the top half of the schematic. The power supply is also used as a control input 406 to other processing circuitry so that switching power can be detected and used as an input to control operation of an LED array, all as generally discussed above. An output stage (depicted in the bottom half of the schematic) includes outputs 408 that can be coupled to LED's for illumination.

Figure 5:
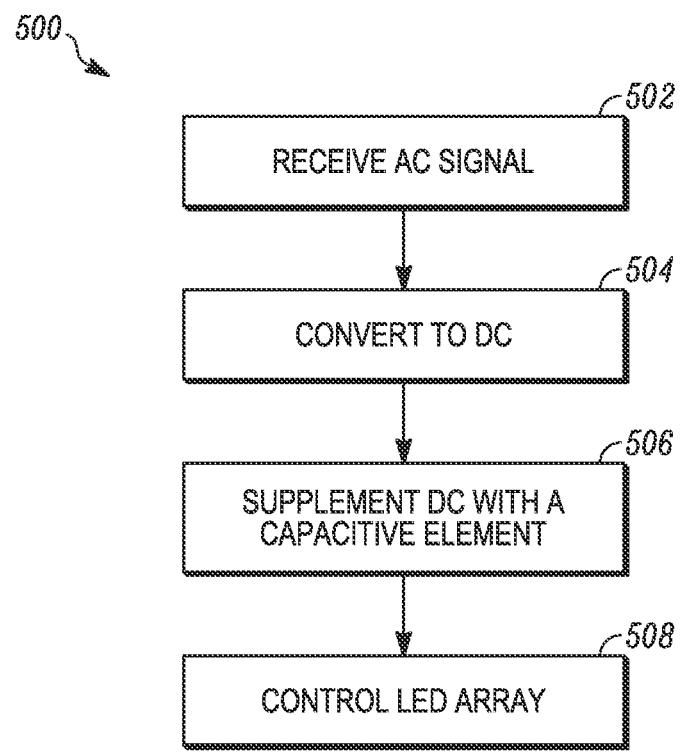
FIG. 5 is a flow chart of a method for operating an LED-based outdoor lighting fixture.

FIG. 5 is a flow chart of a method for operating an LED-based outdoor lighting fixture.

As shown in step 502, the method 500 may begin with receiving an alternating current signal, such as any conventional two or three phase AC power supply, or an alternating current signal specifically adapted for an outdoor or other large venue lighting installation. The alternating current signal may, for example, be provided from a master controller that provides power to a number of street lights.

As shown in step 504, the method 500 may include converting the alternating current signal to a direct current signal with a circuit such as any of the circuits described above. This may include any suitable circuitry for AC/DC conversion including a voltage regulator circuit or the like. The direct current signal may be any generally continuous, regulated voltage output, and may be of a suitable voltage for operating digital circuitry and/or powering light emitting diodes.

As shown in step 506, the method may include supplementing the direct current signal with a capacitive element that provides the direct current signal for an interval during an interruption of the alternating current signal. While a battery is one suitable capacitive element for supplying direct current in the absence of an alternating current signal, the capacitive element may more generally include any capacitor, combination of capacitors, or capacitive circuit that can substitute for output of the AC/DC conversion circuitry in the absence of an alternating current input. In particular, the capacitive element may support continued operation of logic and other digital processing circuitry or the like during brief dropout intervals that might be used, as described above, to signal timing or target illumination intensity to a lighting fixture. This may, for example, include a capacitor on an output of a voltage regulator circuit that continues to provide current at a predetermined voltage for some interval when the output of the voltage regulator circuit decreases. This may also or instead include a capacitor at an input to the voltage regulator circuit, such as where a rectified alternating current is provided. As a significant advantage this may permit continued operation of timer/counting circuitry or the like used in variable nighttime lighting control, so that unintentional or intentional (e.g., signaling) dropouts do not interrupt timing functions and/or operation of LEDs.

As shown in step 508, the method 500 may include controlling an intensity of illumination from an LED array with a second circuit, wherein the intensity is responsive to the interruption of the alternating current signal and wherein the second circuit is powered by the direct current signal. Numerous examples of types of interruptions and responsive illumination are provided above. As further detailed above, the second circuit may either provide direct output to the LED array using pulse-width modulation, variable current, or any other suitable output capable of varying the intensity of illumination provided by LEDs, or the second circuit may provide a control signal used by a separate driver circuit to control intensity of illumination from the LED array.

The circuits described above may be implemented using any suitable technique, which may include analog and/or digital signal processing using discrete components, as well as any number of integrated circuits to provide various signal processing and programming functions as contemplated herein.

Many of the above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory, any of which may serve as the controller described above or supplement processing of the controller with additional circuitry. This may also, or instead, include one or more application specific integrated circuits, programmable gate arrays, programmable array logic components, or any other device(s) that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In other embodiments, disclosed herein are computer program products comprising computer-executable code or computer-usable code that, when executing on one or more computing devices (such as the devices/systems described above), performs any and/or all of the steps described above. The code may be stored in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the processes described above may be embodied in any suitable transmission or propagation medium carrying the computer-executable code described above and/or any inputs or outputs from same.

It will be appreciated that the methods and systems described above are set forth by way of example and not of limitation. Numerous variations, additions, omissions, and other modifications will be apparent to one of ordinary skill in the art. Thus, the order or presentation of method steps in the description and drawings above is not intended to require this order of performing the recited steps unless a particular order is expressly required or otherwise clear from the context.

While particular embodiments of the present invention have been shown and described, it will be apparent to those skilled in the art that various changes and modifications in form and details may be made therein without departing from the spirit and scope of the invention as defined by the following claims. The claims that follow are intended to include all such variations and modifications that might fall within their scope, and should be interpreted in the broadest sense allowable by law.

What is claimed is:

1. An apparatus comprising:
   an outdoor light fixture;
   an LED array mounted in the outdoor light fixture;
   a power line coupled to the outdoor light fixture;
   an actuator that independently switches power from the power line, thereby providing a switched output, wherein the actuator is removably and replaceably coupled to the outdoor fixture through a NEMA locking three prong receptacle; and
   a circuit coupled between the switched output and the LED array, the circuit responsive to one or more predetermined power cycles of the switched output to vary an intensity of illumination from the LED array.

2. The apparatus of claim 1 wherein the outdoor light fixture includes a street light fixture.

3. The apparatus of claim 1 wherein the outdoor light fixture includes a gas lamp fixture.

4. An apparatus comprising:
   an outdoor light fixture for a gas lamp;
   an LED array mounted in the outdoor light fixture;
   a power line coupled to the outdoor light fixture;
   a coupling for an actuator to provide a switched output for at least one lead of the power line, wherein the coupling includes a NEMA locking three prong receptacle; and
   a circuit coupled between the switched output and the LED array, the circuit responsive to one or more predetermined power cycles of the switched output to vary an intensity of illumination from the LED array.

5. An apparatus comprising:
   an outdoor light fixture;
   an LED array mounted in the outdoor light fixture;
   a power line coupled to the outdoor light fixture;
   an actuator that independently switches power from the power line, thereby providing a switched output; and
   a circuit coupled between the switched output and the LED array, the circuit responsive to one or more predetermined power cycles of the switched output to vary an intensity of illumination from the LED array, wherein the circuit includes a first circuit and a second circuit, the first circuit operable to detect the one or more predetermined power cycles and responsively create an intensity control signal and the second circuit including a driver operable to receive the intensity control signal and to create a corresponding power signal to drive the LED array.

6. The apparatus of claim 5 wherein the outdoor light fixture includes a street light fixture.

7. The apparatus of claim 5 wherein the outdoor light fixture includes a gas lamp fixture.

* * * * *